US012773862B2

(12) United States Patent
Ikemoto et al.

(10) Patent No.: US 12,773,862 B2
(45) Date of Patent: Oct. 27, 2026

(54) CUTTING DEVICE INCLUDING CUTTING BLADE AND CUTTING LEVER WHOSE ROTATION CAUSES CUTTING BLADE TO MOVE

(71) Applicant: BROTHER KOGYO KABUSHIKI KAISHA, Nagoya (JP)

(72) Inventors: Yusuke Ikemoto, Nagoya (JP); Tomohiro Wada, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 6 days.

(21) Appl. No.: 18/883,259

(22) Filed: Sep. 12, 2024

(65) Prior Publication Data

US 2025/0083461 A1 Mar. 13, 2025

(30) Foreign Application Priority Data

Sep. 12, 2023 (JP) ................................ 2023-147590

(51) Int. Cl.
*B41J 11/70* (2006.01)
*B41J 3/407* (2006.01)

(52) U.S. Cl.
CPC ........... *B41J 11/703* (2013.01); *B41J 3/4075* (2013.01)

(58) Field of Classification Search
CPC ................................ B41J 3/4075; B41J 11/703
See application file for complete search history.

(56) References Cited

U.S. PATENT DOCUMENTS

2009/0220292 A1* 9/2009 Kato ...................... B41J 3/4075 400/621

FOREIGN PATENT DOCUMENTS

| | | | | | |
|---|---|---|---|---|---|
| EP | 1674274 | A2 * | 6/2006 | ............ | B41J 3/4075 |
| JP | 2010-284879 | A | 12/2010 | | |
| JP | 2013136219 | A * | 7/2013 | | |
| JP | 2022089305 | A * | 6/2022 | ............ | B41J 11/666 |

* cited by examiner

*Primary Examiner* — Christopher E Mahoney
*Assistant Examiner* — Marissa Ferguson-Samreth
(74) *Attorney, Agent, or Firm* — Kenealy Vaidya LLP

(57) ABSTRACT

A cutting device includes a support plate, a shaft, a cutting blade, and a cutter lever. The cutting blade is movable between a cutting position and a retracted position. The cutter lever is supported by the shaft so as to be rotatable about the shaft between a normal position and an operated position. The cutter lever includes a first wall, an insertion part, and a first rib. The first wall faces the support plate in an axial direction. The shaft is inserted in the insertion part. The insertion part protrudes from the first wall in a first direction. The insertion part has a first end portion in contact with the support plate. The first rib protrudes from the first wall in the first direction. The first rib has a first surface. The first surface is in contact with the support plate when the cutter lever is in the normal position.

14 Claims, 9 Drawing Sheets

CUTTING DEVICE INCLUDING CUTTING BLADE AND CUTTING LEVER WHOSE ROTATION CAUSES CUTTING BLADE TO MOVE

REFERENCE TO RELATED APPLICATIONS

This application claims priority from Japanese Patent Application No. 2023-147590 filed on Sep. 12, 2023. The entire content of the priority application is incorporated herein by reference.

BACKGROUND ART

There has been conventionally known a print label creation device that is a handheld device. The conventional print label creation device includes conveying means, printing means, a cutting blade, a blade receiving member, and a cutter lever. The conveying means conveys printing tape along a conveying path to a discharge port while the printing means prints on the printing tape. In response to a user operation on the cutter lever, the printed tape is cut by the cutting blade and blade receiving member to create a print label with the desired printed content.

SUMMARY

While using or carrying around this conventional print label creation device, the user could accidentally drop the device, resulting in the device hitting the ground in any of various orientations. Since the cutter lever is exposed from the housing of this print label creation device, the cutter lever is susceptible to malfunctioning due to the impact of a drop.

In view of the foregoing, it is an object of the present disclosure to provide a cutting device and a mobile printer that can reduce the occurrence of malfunctions caused by falling impacts better than conventional devices.

In order to attain the above and other objects, according to one aspect, the present disclosure provides a cutting device including a support plate, a shaft, a cutting blade, and a cutter lever. The shaft is supported by the support plate. The shaft extends in an axial direction orthogonal to the support plate. The cutting blade is movable between a cutting position for contacting and cutting a cutting target and a retracted position separated from the cutting position. The cutter lever is supported by the shaft so as to be rotatable about the shaft between a normal position and an operated position. Rotation of the cutter lever from the normal position to the operated position causes the cutting blade to move from the retracted position to the cutting position. The cutter lever includes a first wall, an insertion part, and a firs rib. The first wall faces the support plate in the axial direction. The shaft is inserted in the insertion part. The insertion part protrudes from the first wall in a first direction. The first direction is a direction from the first wall toward the support plate along the axial direction. The insertion part has a first end portion in contact with the support plate. The first end portion is an end portion of the insertion part in the first direction. The first rib protrudes from the first wall in the first direction. The first rib has a first surface extending in the axial direction. The first surface is in contact with the support plate when the cutter lever is in the normal position.

In the above configuration, by virtue of the first rib that is in contact with the support plate, the cutting device can disperse an impact on the shaft of the cutter lever from a fall. Therefore, the first rib of the cutting device can help reduce the occurrence of malfunctions caused by impacts due to the cutting device being dropped better than a conventional cutting device not provided with the first rib.

According to another aspect, the present disclosure provides a mobile printer including a print head, and a cutting device. The print head is configured to print on a tape. The cutting device is configured to cut the tape. The cutting device includes a support plate, a shaft, a cutting blade, and a cutter lever. The shaft is supported by the support plate. The shaft extends in an axial direction orthogonal to the support plate. The cutting blade is movable between a cutting position for contacting and cutting the tape and a retracted position separated from the cutting position. The cutter lever is supported by the shaft so as to be rotatable about the shaft between a normal position and an operated position. Rotation of the cutter lever from the normal position to the operated position causes the cutting blade to move from the retracted position to the cutting position. The cutter lever includes a first wall, an insertion part, and a first rib. The first wall faces the support plate in the axial direction. The shaft is inserted in the insertion part. The insertion part protrudes from the first wall in a first direction. The first direction is a direction from the first wall toward the support plate along the axial direction. The insertion part has a first end portion in contact with the support plate. The first end portion is an end portion of the insertion part in the first direction. The first rib protrudes from the first wall in the first direction. The first rib has a first surface extending in the axial direction. The first surface is in contact with the support plate when the cutter lever is in the normal position.

In the above configuration, by virtue of the first rib that is in contact with the support plate, the mobile printer can disperse an impact on the shaft of the cutter lever from a fall. Therefore, the first rib of the mobile printer can help reduce the occurrence of malfunctions caused by impacts due to the mobile printer being dropped better than a conventional mobile printer not provided with the first rib.

Figure 3:
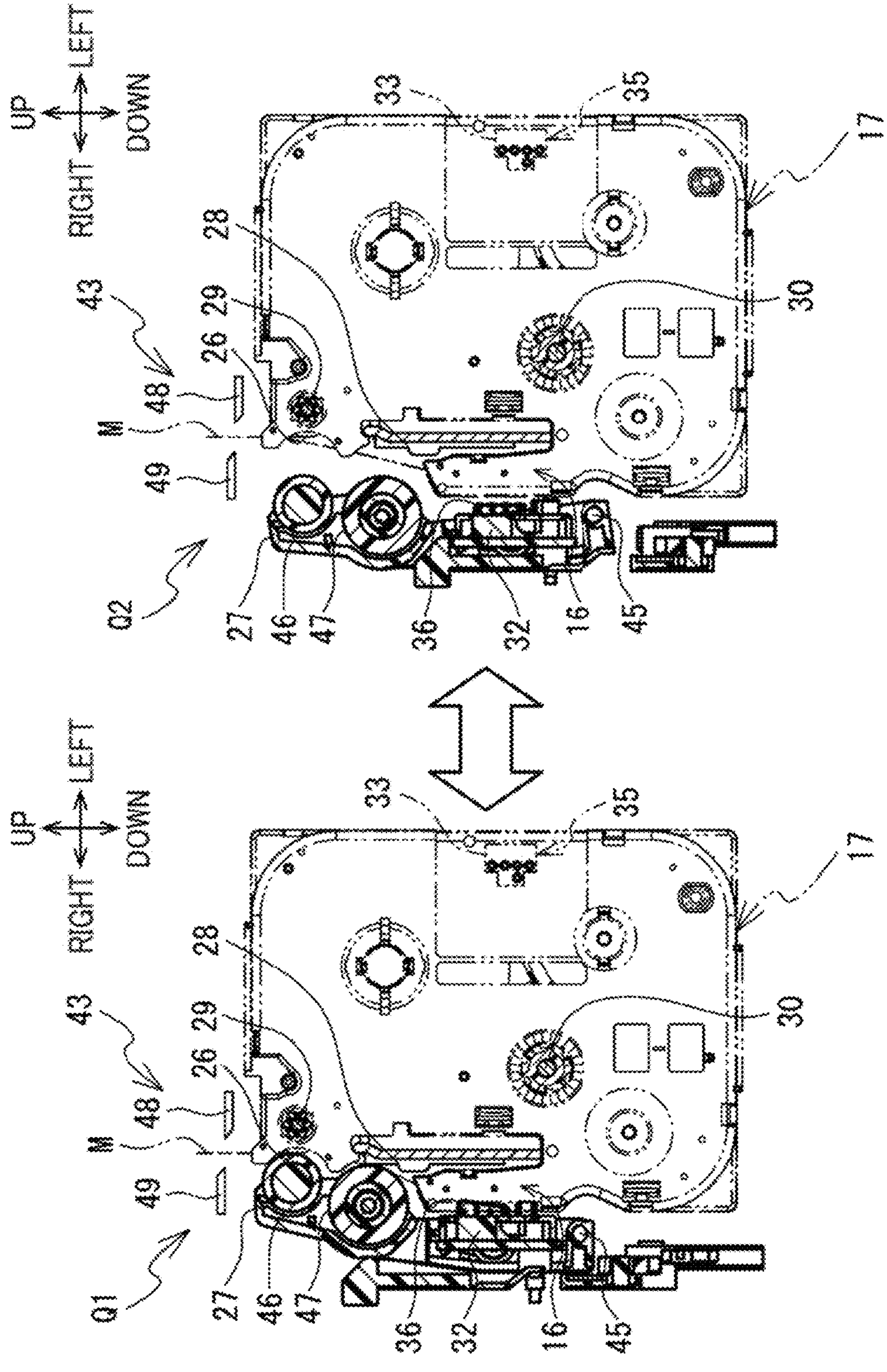

FIG. 3 illustrates a partial cross-sectional view of a roller holder 27 as viewed from the rear when the rear cover 5 is closed (state Q1), and a partial cross-sectional view of the roller holder 27 as viewed from the rear when the rear cover 5 is open (state Q2).

Figure 4:
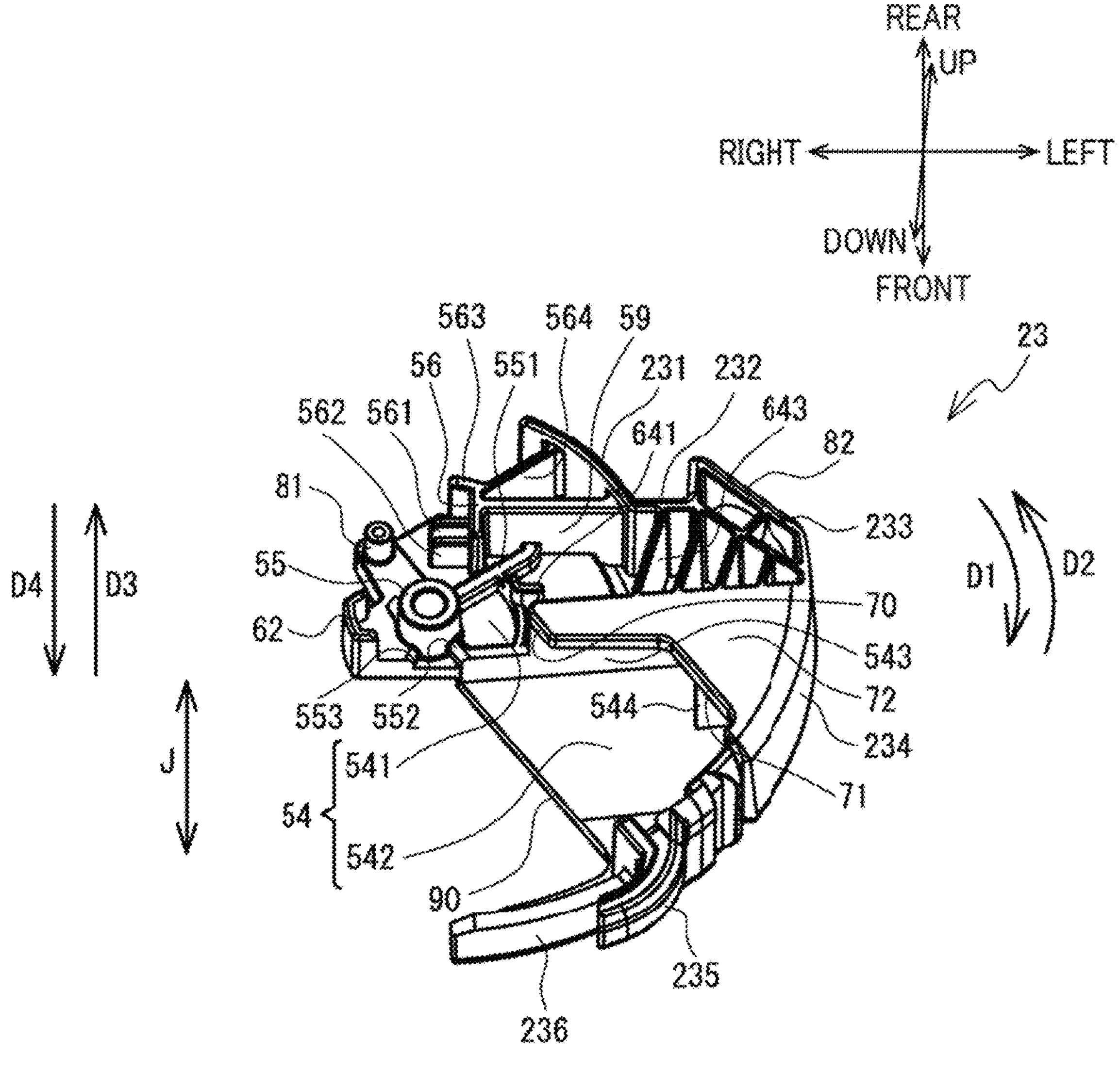

FIG. 4 is a perspective view of a cutter lever 23.

Figure 5:
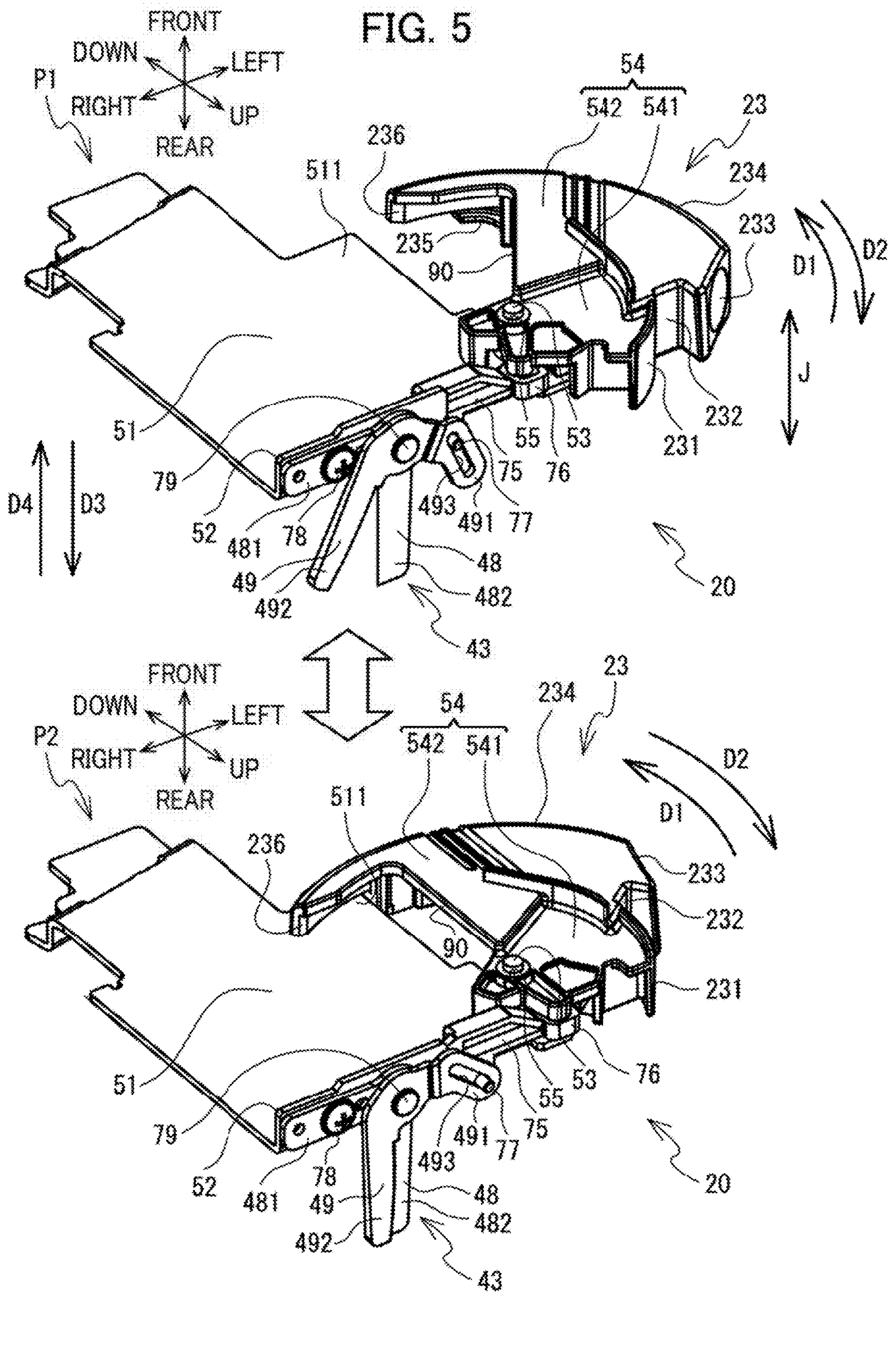

FIG. 5 illustrates a perspective view of a cutting device 20 when the cutter lever 23 is in a normal position and a movable blade 49 is in a retracted position (state P1), and a perspective view of the cutting device 20 when the cutter lever 23 is in an operated position and the movable blade 49 is in a cutting position (state P2).

Figure 6:
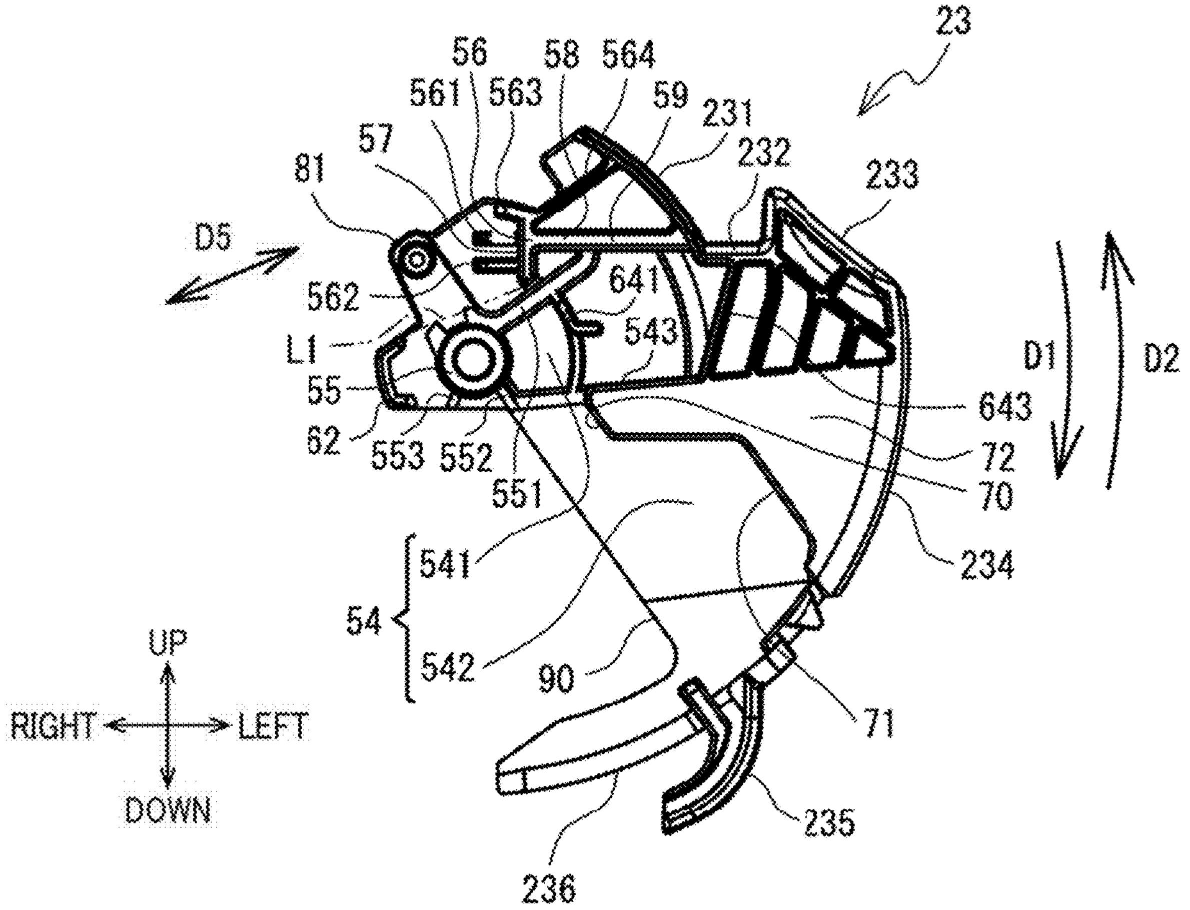

FIG. 6 is a rear view of the cutter lever 23.

Figure 7:
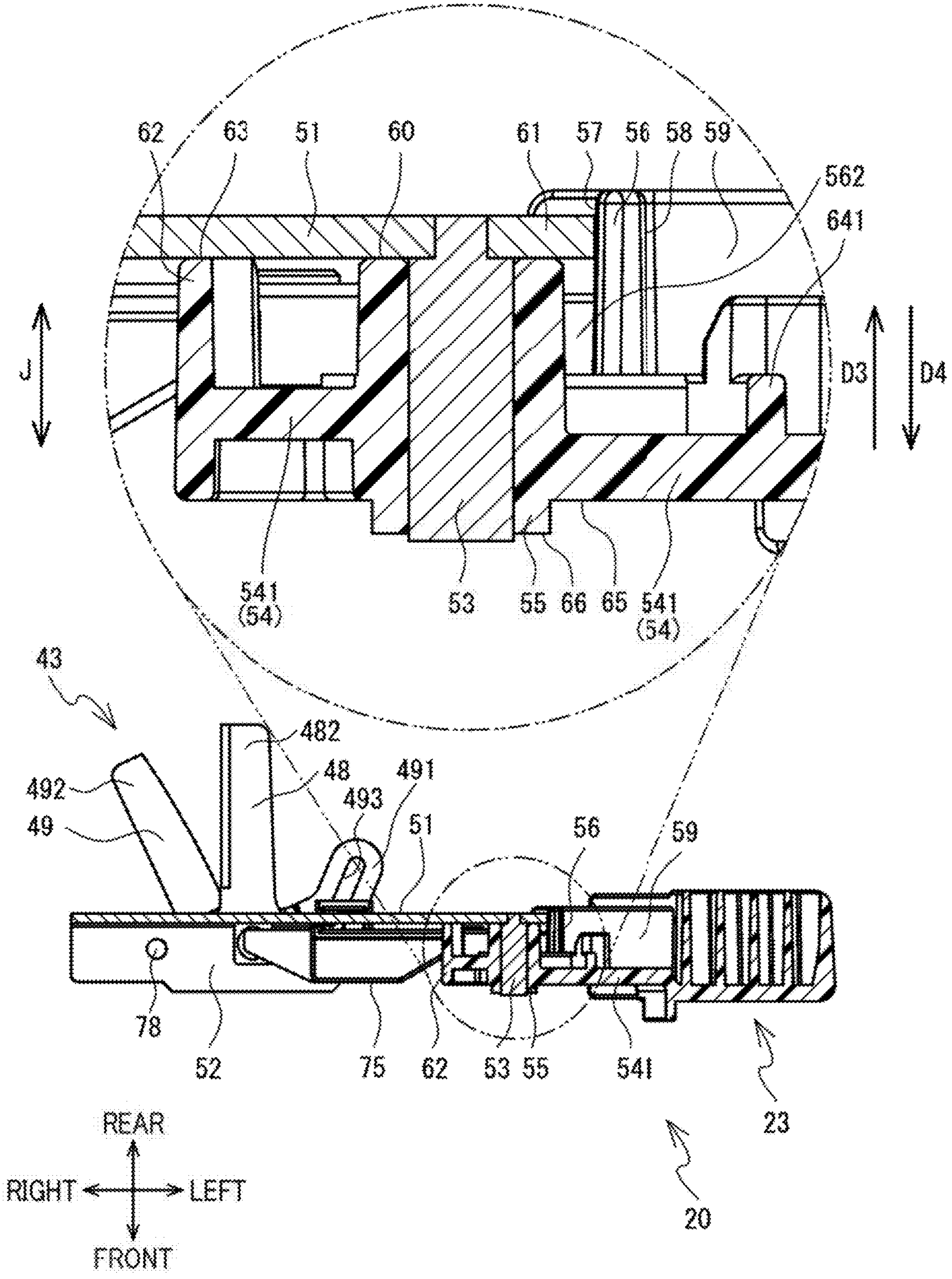
Figure 8:
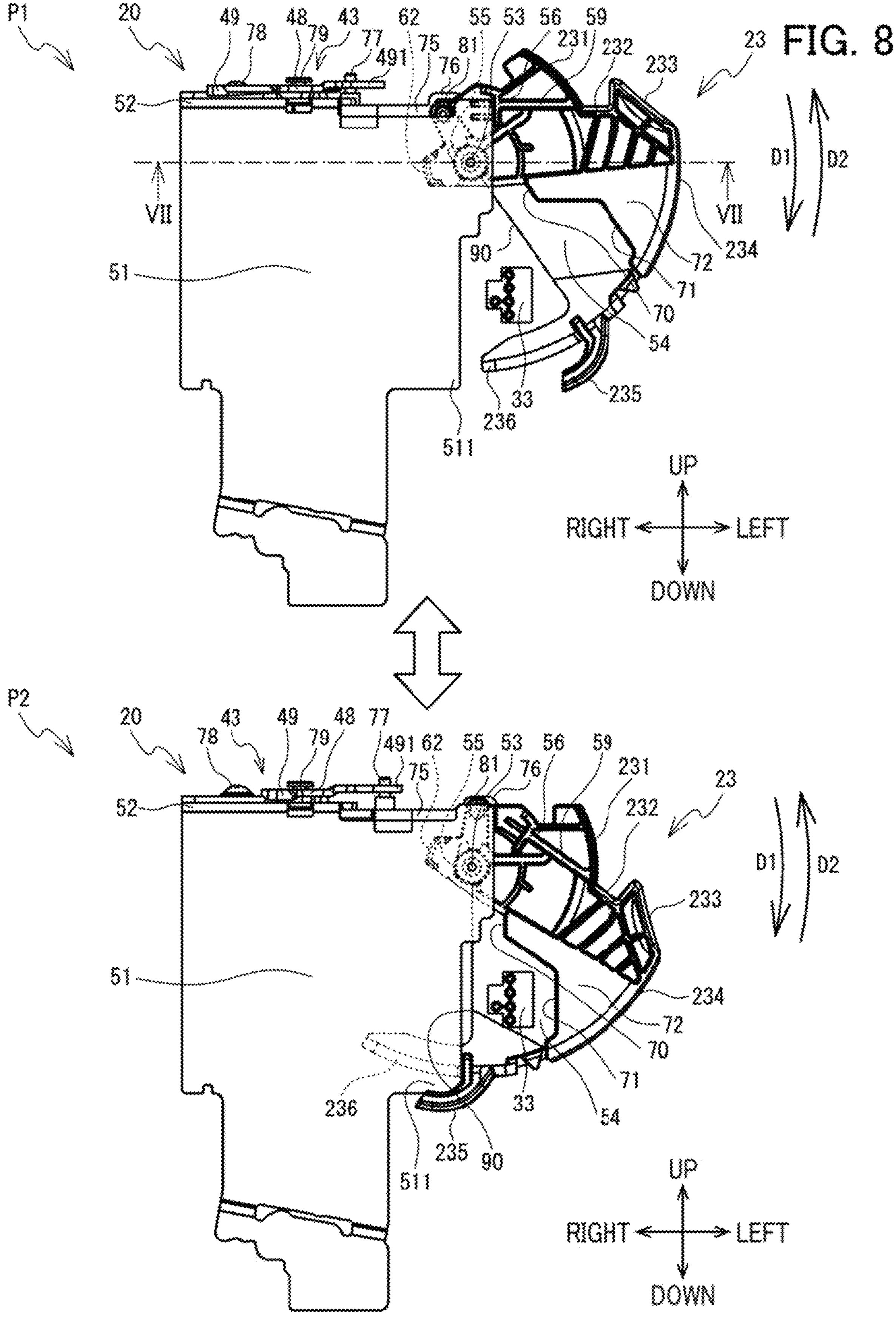

FIG. 7 is a cross-sectional view of the cutting device 20 taken along line VII-VII of FIG. 8.

FIG. 8 illustrates a rear view of the cutting device 20 when the cutter lever 23 is in the normal position and the movable blade 49 is in the retracted position (state P1), and a rear view of the cutting device 20 when the cutter lever 23 is in the operated position and the movable blade 49 is in the cutting position (state P2).

Figure 9:
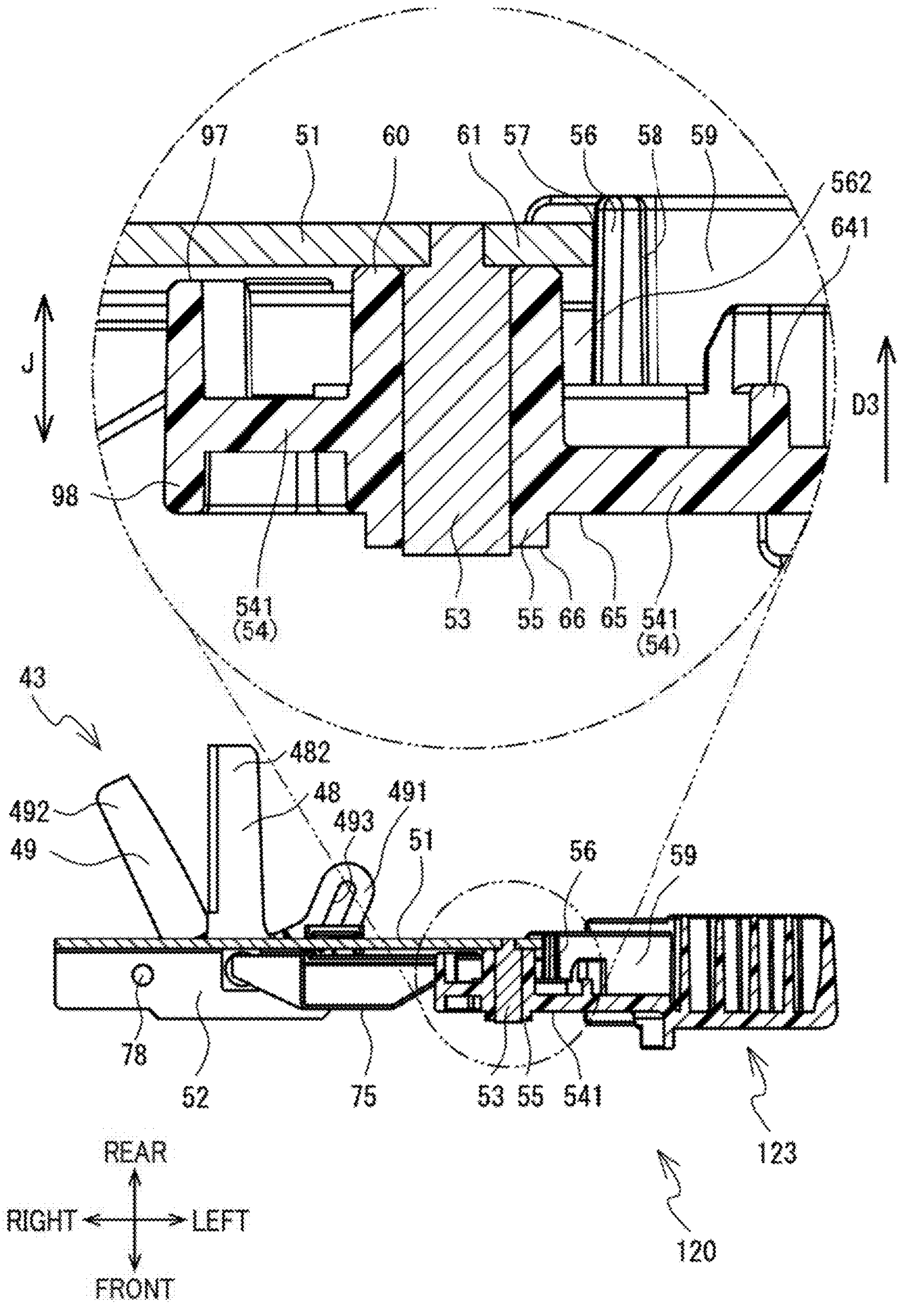

FIG. 9 is a cross-sectional view of a cutting device 120 that corresponds to the cross-sectional view of the cutting device 20 taken along line VII-VII of FIG. 8.

DESCRIPTION

Below, an embodiment of the present disclosure will be described while referring to the accompanying drawings.

Figure 1:
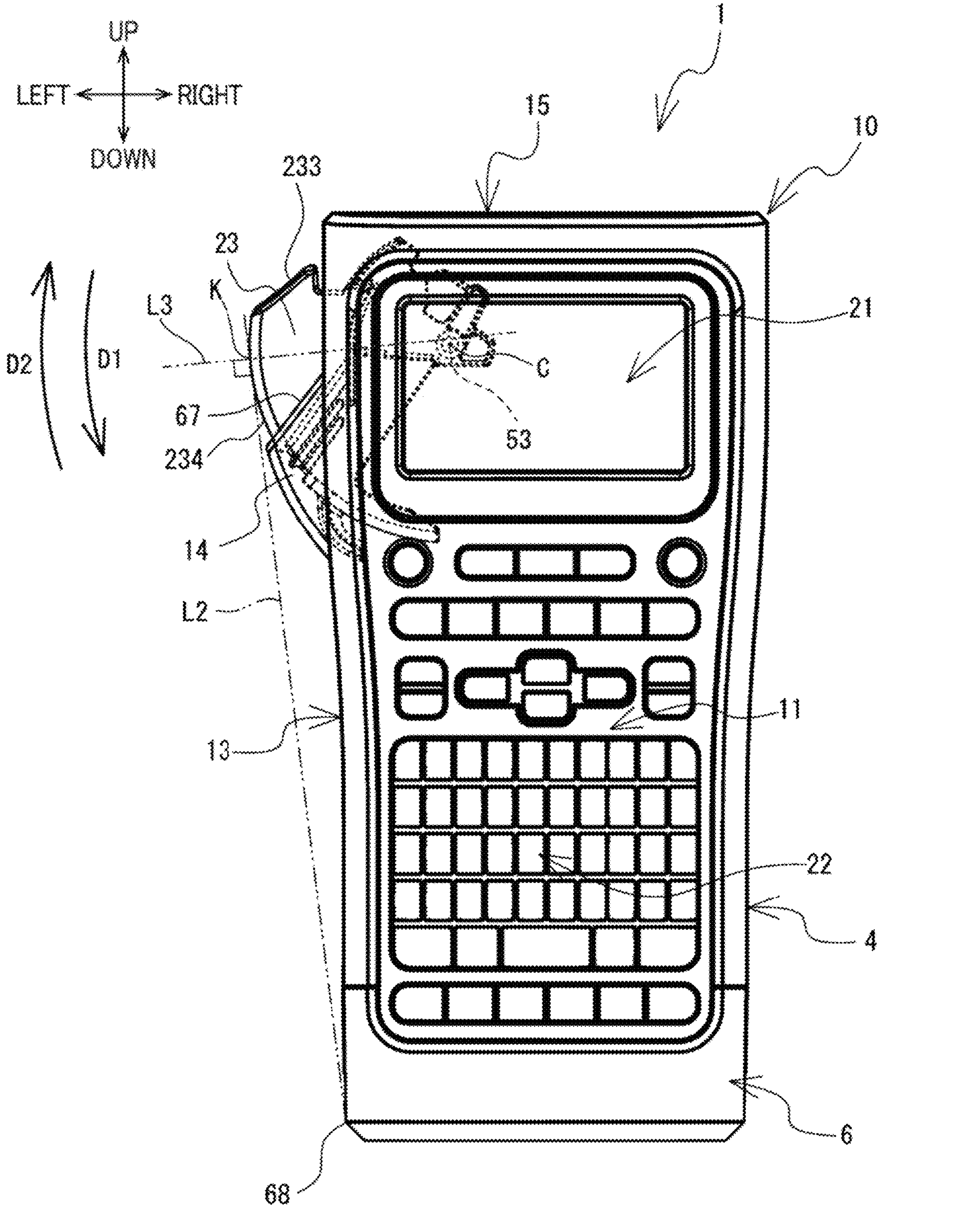
FIG. 1 is a front view of a mobile printer 1.

The up-down direction and left-right direction indicated in FIG. 1 correspond respectively to the up-down direction and left-right direction of a mobile printer 1 (a portable printer 1). Hereinafter, the mobile printer 1 will be simply called the "printer 1". However, the up, down, left, and right directions relative to the printer 1 are defined here for convenience, as the printer 1 is not necessarily limited to the orientation shown in FIG. 1.

Figure 2:
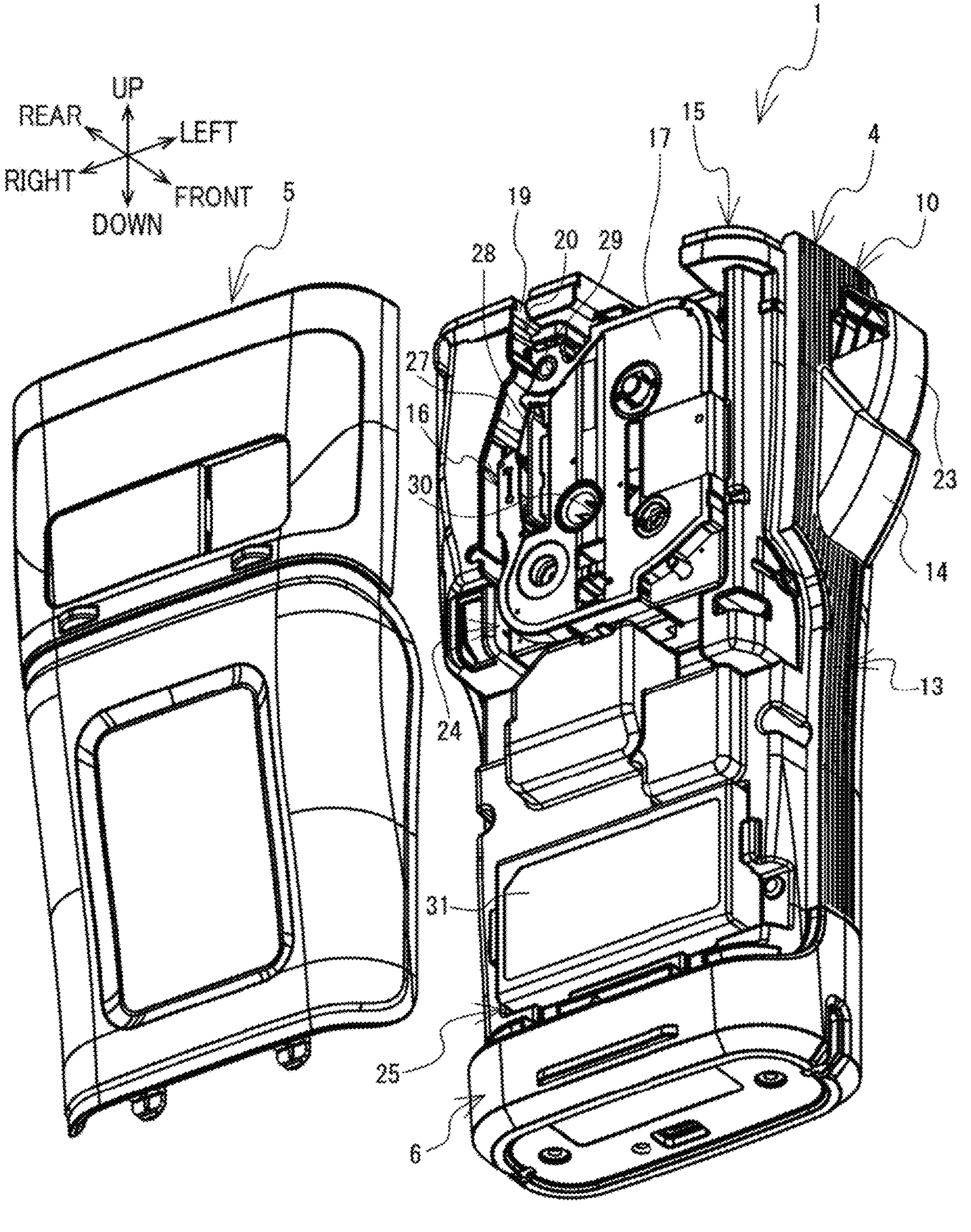
FIG. 2 is a perspective view of the mobile printer 1 with a rear cover 5 open.

As shown in FIGS. 1 through 3, the printer 1 is a portable label printer configured to create labels by printing images on a tape M drawn out of a cassette 17. The printer 1 can use cassettes 17 that accommodate various types of tape, such as a receptor-type, a thermal-type, a laminated-type, and a tube-type. For example, the tape M may be any of a single-sided adhesive tape, a thermal paper tape, a double-sided adhesive tape, a film tape, and a tube tape. An indicator 16 is provided on the right surface of the cassette 17 for indicating the type of tape M. The indicator 16 has one or more holes arranged in a defined pattern according to the type of tape M. In addition, an indicator 35 is provided on the front surface of the cassette 17 to indicate the color of the ink ribbon. The indicator 35 has one or more holes arranged in a defined pattern according to the color of the ink ribbon. The printer 1 is configured to print images such as text and graphics on the tape M.

The printer 1 includes a housing 10, a display unit 21, and an input unit 22. The housing 10 has a box shape that is elongated in the up-down direction. The housing 10 includes a main body 4, a rear cover 5, a bottom cover 6, and a lever accommodating part 14. The main body 4 has a box shape that is open on the rear side. The rear cover 5 is detachably mounted on the main body 4. The housing 10 has a top surface 15, a left surface 13, and a front surface 11. A discharging port 19 is formed in the top surface 15 of the housing 10 and penetrates the top surface 15 in the up-down direction. The bottom cover 6 has a box shape with an opening on the top. The bottom cover 6 is detachably mounted on the main body 4 for protecting the bottom end portion of the main body 4. The lever accommodating part 14 is provided in the upper end portion of the left surface 13 of the housing 10 and expands leftward from the left surface 13. The top portion of the lever accommodating part 14 is open. That is, the left surface 13 of the housing 10 has an opening 67 that exposes a portion of a cutter lever 23 (described later) to the outside of the housing 10.

The display unit 21 is a liquid crystal display, for example, and is configured to display various information. The display unit 21 is provided on the front surface 11 of the housing 10 at a position upper than the approximate vertical center of the housing 10. The input unit 22 is configured to accept various information inputted through user operations. The input unit 22 is disposed on the front surface 11 of the housing 10 below the display unit 21. The input unit 22 includes various switches, such as a Print button, a Shift key, and an Esc key.

The printer 1 includes a cassette mounting compartment 24, a roller drive shaft 29, a ribbon take-up shaft 30, a sensor 33, a battery compartment 25, a print head 28, a roller holder 27, and a cutting device 20 that are all provided inside the housing 10, and more specifically inside the main body 4 on the front side of the rear cover 5. The cassette mounting compartment 24 is provided in the main body 4 of the housing 10 at a position above the vertical center of the main body 4. The cassette mounting compartment 24 is a recess that is recessed forward (frontward). The cassette 17 is mountable in and detachable from the cassette mounting compartment 24. The sensor 33 is provided in the left portion of the cassette mounting compartment 24. The sensor 33 is configured to detect the presence or absence of holes in the indicator 35 provided on the front surface of the cassette 17. The battery compartment 25 is provided in the main body 4 of the housing 10 below the vertical center of the main body 4. The battery compartment 25 is a recess that is recessed forward. The battery compartment 25 is configured to accommodate therein a battery 31. When the rear cover 5 is removed from the main body 4, the cassette mounting compartment 24 and the battery compartment 25 are exposed to the outside of the printer 1. While the rear cover 5 is removed from the main body 4, the user can replace both the cassette 17 and the battery 31.

The print head 28 is a thermal head configured to print on tape M. The printer 1 pays out and conveys tape M from the cassette mounting compartment 24 by driving the roller drive shaft 29. The printer 1 prints on the tape M by transferring ink from the ink ribbon onto the tape M by heating the ink ribbon with the print head 28. The roller drive shaft 29 rotates a roller 26 in the cassette 17 under the power of a motor (not shown) to draw tape M out of the cassette 17 and to convey the tape M. The ribbon take-up shaft 30 also rotates under the power of a motor (not shown) to draw ink ribbon out of the cassette 17 and to take up the ink ribbon that has passed the print head 28.

The roller holder 27 is positioned to the right of the cassette mounting compartment 24. The roller holder 27 extends in the up-down direction. The roller holder 27 is supported at the lower end of the roller holder 27 by a pivot shaft 45 so as to be pivotally movable about the pivot shaft 45. The pivot shaft 45 extends in the front-rear direction. A platen roller 47 and a tape sub-roller 46 are supported by the roller holder 27 so as to be rotatable in the counterclockwise direction when viewed from the rear. The platen roller 47 is provided to the right of the print head 28. The tape sub-roller 46 is provided to the right of the roller drive shaft 29 and near the top of the platen roller 47. A cassette sensor 32 is provided on the roller holder 27 between the platen roller 47 and the pivot shaft 45 in the up-down direction. The cassette sensor 32 includes a plurality of detection switches 36 configured to detect the presence or absence of holes in the indicator 16 provided on the right surface of the cassette 17. Each of the detection switches 36 extends in the left-right direction. A spring (not shown) urges the roller holder 27 to pivotally move rightward about the pivot shaft 45. When the rear cover 5 is closed while the cassette 17 is mounted in the printer 1, the roller holder 27 is pressed leftward and pivotally moves leftward against the urging force of the spring (not shown).

When the rear cover 5 is closed while the cassette 17 is mounted in the printer 1, the roller holder 27 is pivotally moved leftward to bring the cassette sensor 32 near the cassette 17, as shown in state Q1 of FIG. 3. When the cassette sensor 32 is brought near the cassette 17, the detection switches 36 of the cassette sensor 32 are selectively pressed by the indicator 16 of the cassette 17. The cassette sensor 32 outputs a detection signal based on the combination of ON/OFF states of the detection switches 36 at this time. When the rear cover 5 is opened or while the cassette 17 is not mounted in the printer 1, the roller holder 27 pivotally moves rightward to move the cassette sensor 32 away from the cassette 17, as shown in state Q2 of FIG. 3. When the cassette sensor 32 is separated from the cassette 17, the cassette sensor 32 cannot detect the cassette 17 since none of the detection switches 36 in the cassette sensor 32 are pressed by the indicator 16 of the cassette 17.

The cutting device 20 is provided below the discharging port 19. As shown in FIGS. 4 through 8, the cutting device 20 includes a support plate 51, a fixed blade 48, a movable blade 49, the cutter lever 23, and a transmission member 75. The support plate 51 is disposed forward of the cassette mounting compartment 24. The support plate 51 is a plate elongated in the up-down direction. The support plate 51 has a top edge 52, which is bent forward. The fixed blade 48 has a plate shape having an L-shape in a plan view. The fixed blade 48 includes a fixed portion 481 extending in the left-right direction, and a blade portion 482 extending rearward from the left end of the fixed portion 481. The fixed portion 481 is fixed to the top edge 52 of the support plate 51 by a screw 78 and a pin 79. The blade portion 482 has a rightward-facing cutting edge. The movable blade 49 has a plate shape having an L-shape in a plan view. The movable blade 49 includes a fixed portion 491, and a blade portion 492. Hereinafter, the fixed blade 48 and movable blade 49 will be sometimes referred to as "cutting blades 43".

The movable blade 49 is movable between a cutting position shown in state P2 of FIG. 5, and a retracted position shown in state P1 of FIG. 5. In the cutting position, the movable blade 49 can contact and cut a cutting target (e.g., the tape M). In the retracted position, the movable blade 49 is separated from the cutting target. The movable blade 49 is fixed to the support plate 51 with the cutting edge of the blade portion 492 facing leftward. The movable blade 49 is fixed to the support plate 51 so as to be rotatable about the pin 79. An elongated hole 493 is formed in the fixed portion 491. The elongated hole 493 extends in the longitudinal direction of the fixed portion 491. The longitudinal direction of the fixed portion 491 is diagonally leftward and rearward when the movable blade 49 is in the retracted position.

The cutter lever 23 is supported by a shaft 53 so as to be rotatable about the shaft 53 between an operated position shown in state P2 of FIG. 5, and a normal position shown in state P1 of FIG. 5. In the operated position, the cutter lever 23 places the movable blade 49 in the cutting position. In the normal position, the cutter lever 23 places the movable blade 49 in the retracted position. The shaft 53 extends in an axial direction J. The shaft 53 is supported by the support plate 51. In other words, the cutter lever 23 is supported by the support plate 51 via the shaft 53. The axial direction J is perpendicular to the support plate 51. A torsion spring (not shown) is wound around an insertion part 55. The torsion spring is disposed around the insertion part 55 between a connecting portion 541 described later and the support plate 51. The axial direction J in the present embodiment is the front-rear direction. The cutter lever 23 is urged to rotate clockwise in a front view by the torsion spring. The lower end portion of the cutter lever 23 is covered by the lever accommodating part 14 and the main body 4. When the cutter lever 23 is in the normal position, the cutter lever 23 is exposed outside of the housing 10. The upper end portion of the cutter lever 23 moves in and out of the housing 10 through the opening 67 formed in the lever accommodating part 14 in response to user operations.

As shown in FIG. 1, the direction in which the cutter lever 23 is moved (rotated) from the normal position to the operated position will be called an operating direction D1, while the direction in which the cutter lever 23 returns to the normal position from the operated position will be called a returning direction D2. The left surface 13 has a sixth end portion 68. The sixth end portion 68 is the end portion of the left surface 13 in the operating direction D1. Here, the center C of the shaft 53 is positioned further in the operating direction D1 than a perpendicular line L3 to a tangent line L2 drawn from the sixth end portion 68 to the cutter lever 23 (specifically, to a side wall 234 of the cutter lever 23). The perpendicular line L3 is on a virtual plane along a first wall 54 of the support plate 51. The perpendicular line L3 passes through an intersecting point K at which the tangent line L2 intersects the side wall 234 of the cutter lever 23, i.e., passes through the point of tangency with the cutter lever 23.

In the present embodiment, the operating direction D1 in which the cutter lever 23 moves from the normal position to the operated position is the counterclockwise direction around the shaft 53 in a front view. In the present embodiment, the operating direction D1 is approximately downward when the cutter lever 23 is in the normal position. In the present embodiment, the virtual plane along the first wall 54 is a plane perpendicular to the axial direction J, i.e., a plane perpendicular to the front-rear direction. The sixth end portion 68 in this embodiment is the lower end portion of the left surface 13. The tangent line L2 extends upward and slightly leftward from the sixth end portion 68. The perpendicular line L3 extends rightward and slightly upward from the intersecting point K. The lever accommodating part 14 protrudes from the left surface 13. The lever accommodating part 14 accommodates a portion of the cutter lever 23 in a manner that allows rotation of the cutter lever 23 and exposes an operating wall portion 233 of the cutter lever 23 to the outside of the housing 10. The operating wall portion 233 is positioned at the end portion of the cutter lever 23 in the returning direction D2 opposite the operating direction D1.

As shown in FIGS. 4 through 7, the cutter lever 23 includes the first wall 54; a second wall 72; wall portions 543 and 544; side walls 231, 232, and 234; the operating wall portion 233; protruding portions 235 and 236; the insertion part 55; a first rib 56; a reinforcement rib 59; a second rib 62; ribs 551 through 553; ribs 561 through 564; ribs 641 and 643; and a pin 81. The configuration of the cutter lever 23 will be described next on the assumption that the cutter lever 23 is in the normal position.

The first wall 54 and second wall 72 each have a plate shape with a thickness in the front-rear direction. The first wall 54 is disposed forward of the support plate 51. A portion of the first wall 54 is configured to face the support plate 51. The first wall 54 includes the connecting portion 541 and an outer wall portion 542. The connecting portion 541 is a fan-shaped portion in a front view. The connecting portion 541 is arranged on the periphery of the insertion part 55 and is connected to the insertion part 55. The outer wall portion 542 is positioned farther from the shaft 53 than the connecting portion 541 is from the shaft 53. The outer wall portion 542 is connected to the connecting portion 541. The front surface of the outer wall portion 542 is positioned further forward than the front surface of the connecting portion 541. The connection portion between the connecting portion 541 to the outer wall portion 542 is a stepped portion.

As shown in FIG. 5, a direction toward the support plate 51 from the first wall 54 along the shaft 53 (i.e., along the axial direction J) will be referred to as the "facing direction D3". The second wall 72 is positioned further in the facing direction D3 than the first wall 54. In other words, the second wall 72 is disposed rearward of the first wall 54. The second wall 72 has an eighth end portion 70. The eighth end portion 70 is the end portion of the second wall 72 in the operating direction D1. The first wall 54 has a ninth end portion 90. The ninth end portion 90 is the end portion of the first wall 54 in the operating direction D1. The second wall 72 has a recess 71. Specifically, the eighth end portion 70 of the second wall 72 is recessed in the returning direction D2 relative to the ninth end portion 90 of the first wall 54 to form the recess 71. As shown in state P2 of FIG. 8, when the cutter lever 23 is in the operated position, the first wall 54 faces the sensor 33 in the axial direction J, and the second wall 72 faces the sensor 33 in the operating direction D1. Accordingly, the recess 71 suppresses interference between the sensor 33 and second wall 72 when the cutter lever 23 is in the operated position. The wall portions 543 and 544 connect the first wall 54 and the second wall 72 to each other in the front-rear direction. The wall portion 543 extends substantially in the left-right direction in the area where the connecting portion 541 and outer wall portion 542 are connected. The wall portion 544 extends in the left-right direction below the wall portion 543.

The side walls 231, 232, and 234 connect the outer circumferential edges of the first wall 54 and second wall 72 in the front-rear direction. The side wall 231 is provided on the upper end portion of the cutter lever 23. The side wall 231 has an arc shape in a front view. The side wall 232 is connected to the side wall 231 and extends in the left-right direction. The side wall 232 faces upward. When the cutter lever 23 is in the normal position, the side wall 232 is made to contact an upper edge defining the opening 67 by the urging force of the torsion spring wound about the insertion part 55. The side wall 234 is positioned lower than the side walls 231 and 232. The side wall 234 is connected to the bottom edge of the operating wall portion 233. The side wall 234 has an arc shape centered on the shaft 53 in a front view. The distance between the side wall 234 and the shaft 53 is greater than the distance between the side wall 231 and the shaft 53. The operating wall portion 233 is connected to the side walls 232 and 234. In the up-down direction, the operating wall portion 233 is positioned higher than the shaft 53. The operating wall portion 233 is the portion that the user operates when pressing the cutter lever 23 in the operating direction D1.

The protruding portion 235 protrudes from the bottom edge of the first wall 54 while curving downward and rightward. With respect to the front-rear direction, the extended range of the support plate 51 falls within the extended range of the protruding portion 235. That is, with respect to the front-rear direction, the range over which the support plate 51 extends falls within the range over which the protruding portion 235 extends. In the present embodiment, the front end of the protruding portion 235 is positioned further forward than the front surface of the support plate 51 and the rear end of the protruding portion 236 is positioned further rearward than the rear surface of the support plate 51. When the cutter lever 23 is moved into the operated position, the protruding portion 235 contacts a corner portion 511 of the support plate 51. The corner portion 511 constitutes the bottom of the left portion of the support plate 51. The protruding portion 235 restricts the cutter lever 23 from moving further in the operating direction D1 than the operated position. The protruding portion 236 extends from the bottom edge of the first wall 54 in an arc shape centered on the shaft 53. With respect to the front-rear direction, the protruding portion 236 is positioned further forward than the protruding portion 235 and the support plate 51. When the cutter lever 23 is moved into the operated position, the protruding portion 236 turns on a microswitch (not shown) provided on the support plate 51. Based on the signal from the microswitch, the printer 1 controls conveyance of the tape M by rotating the roller drive shaft 29.

The shaft 53 is inserted into the insertion part 55. The insertion part 55 has a tubular shape that protrudes from the first wall 54 in the facing direction D3. As shown in FIG. 7, the insertion part 55 has a first end portion 60 and a fifth end portion 66. The first end portion 60 is the end portion of the insertion part 55 in the facing direction D3. The fifth end portion 66 is the end portion of the insertion part 55 in a separating direction D4 opposite the facing direction D3. The first end portion 60 of the insertion part 55 is in contact with the support plate 51. The connecting portion 541 has a fourth end portion 65. The fourth end portion 65 is the end portion of the connecting portion 541 in the separating direction D4. The fourth end portion 65 of the connecting portion 541 is positioned further in the facing direction D3 than the fifth end portion 66 of the insertion part 55. In other words, the area in which the connecting portion 541 and the insertion part 55 are connected to each other is separated from both ends of the insertion part 55 in the axial direction J.

As shown in FIGS. 4 and 6, the first rib 56 protrudes in the facing direction D3 from the first wall 54 at the upper left of the insertion part 55. The first rib 56 extends in the up-down direction. As shown in FIG. 7, the first rib 56 has a first surface 57 and a second surface 58 opposite the first surface 57. The first surface 57 extends in the axial direction J. The first surface 57 of the first rib 56 is in contact with the support plate 51 when the cutter lever 23 is in the normal position. In the present embodiment, the first surface 57 is the right surface of the first rib 56. Specifically, when the cutter lever 23 is in the normal position, the first surface 57 of the first rib 56 is in contact with a second end portion 61 of the support plate 51. The second end portion 61 is an end portion of the support plate 51 in a direction orthogonal to the axial direction J. In the present embodiment, the second end portion 61 is the upper-left end portion of the support plate 51.

As shown in FIGS. 4 and 6, the reinforcement rib 59 protrudes in the facing direction D3 from the first wall 54 and is connected to the second surface 58 of the first rib 56. The reinforcement rib 59 extends in the left-right direction. The right edge of the reinforcement rib 59 is connected at approximately a right angle to the second surface 58 of the first rib 56, i.e., the left surface of the first rib 56. The left edge of the reinforcement rib 59 is connected to the lower edge portion of the right surface of the side wall 231. With respect to the up-down direction, the reinforcement rib 59 is positioned higher than the side wall 232.

The second rib 62 protrudes in the facing direction D3 from the first wall 54 at a position apart from the insertion part 55 in a direction perpendicular to the axial direction J. As shown in FIG. 7, the second rib 62 has a third end portion 63. The third end portion 63 is the end portion of the second rib 62 in the facing direction D3. When the cutter lever 23 is in the normal position, the third end portion 63 of the second rib 62 is in contact with the front surface of the support plate 51. As shown in FIGS. 4 and 6, the second rib 62 has a U-shape that opens toward the insertion part 55 in a rear view, i.e., a view from the third end portion 63 side in the facing direction D3. With respect to the up-down direction, the extended range of the second rib 62 falls between 0.8 times and 1.2 times the extended range of the insertion part 55 (i.e., the outer diameter of the insertion part 55). In other words, with respect to the up-down direction, the range over which the second rib 62 extends falls between 0.8 times and 1.2 times the range over which the insertion part 55 extends. As shown in FIG. 6, the insertion part 55 is positioned between the first rib 56 and the second rib 62 in an extension direction D5. The extension direction D5 is the direction in which a line segment L1 connecting the first rib

56 to the second rib 62 extends. The extension direction D5 in this embodiment is a direction extending rightward and slightly downward. In the present embodiment, the insertion part 55 is positioned between the first rib 56 and second rib 62 in the left-right direction.

As shown in FIGS. 4 and 6, each of the ribs 551 through 553, 561 through 564, 641, and 643 extends in the facing direction D3 from the first wall 54. The rib 551 extends diagonally upward and leftward from the upper-left portion of the insertion part 55 and connects to the reinforcement rib 59. The rib 552 extends diagonally downward and leftward from the lower-left portion of the insertion part 55. The rib 553 extends diagonally downward and rightward from the lower-right portion of the insertion part 55. The ribs 561 and 562 extend rightward from the first surface 57 of the first rib 56. The lengths of the ribs 561 and 562 in the facing direction D3 are shorter than the length of the first rib 56 in the facing direction D3. As shown in FIG. 7, the ribs 561 and 562 are spaced apart from the support plate 51 in the front-rear direction when the cutter lever 23 is in the normal position. As shown in FIGS. 4 and 6, the rib 563 extends diagonally upward and rightward from the top edge of the first rib 56. The rib 564 extends diagonally upward and leftward from the top edge of the first rib 56 and connects to the side wall 231. The rib 641 extends in an arc shape centered on the shaft 53 at a position to the left of the insertion part 55. The top edge of the rib 641 is connected to the rib 551. The rib 643 is connected to the side wall 232 and the wall portion 543 on the left side of the rib 641.

The pin 81 protrudes in the facing direction D3 from the first wall 54 at a position rightward of the first rib 56 and upper than the insertion part 55. The pin 81 is inserted into an insertion part 76 of the transmission member 75 and transmits the rotation of the cutter lever 23 to the movable blade 49 via the transmission member 75.

The transmission member 75 is elongated in the left-right direction and disposed below the top edge 52 of the support plate 51. The transmission member 75 includes the insertion part 76 and a pin 77. The insertion part 76 is provided on the left end portion of the transmission member 75 and has an elongated hole in which the pin 81 of the cutter lever 23 is inserted. The pin 77 protrudes upward from the right-rear portion of the transmission member 75. The pin 77 is inserted into the elongated hole 493 of the movable blade 49. The transmission member 75 is movable in the left-right direction relative to the support plate 51 in response to the rotation of the cutter lever 23.

When the cutter lever 23 is in the normal position shown in state P1 of FIGS. 5 and 8, the pin 81 is positioned above and to the right of the shaft 53, while the pin 77 is positioned in the front end portion of the elongated hole 493. At this time, the movable blade 49 is in the retracted position, and the rear end portion of the blade portion 492 is separated from the fixed blade 48. When the user operates the cutter lever 23 by pressing the operating wall portion 233 diagonally downward and rightward in the operating direction D1, the cutter lever 23 rotates counterclockwise about the shaft 53 in a front side view against the urging force of the torsion spring wound around the insertion part 55 and moves to the operated position indicated by state P2 in FIGS. 5 and 8. When the cutter lever 23 is in the operated position, the pin 81 is positioned above the shaft 53. At this time, the transmission member 75 is positioned further leftward than when the cutter lever 23 is in the normal position, and the pin 77 is positioned in the left-rear end portion of the elongated hole 493. Further, the movable blade 49 is in the cutting position, with the rear end of the blade portion 492 overlapping the fixed blade 48 in the left-right direction. When the user releases the cutter lever 23 (halts the pressing operation), the cutter lever 23 is rotated back to the normal position by the urging force of the torsion spring wound around the insertion part 55. The tape M cut by the cutting blades 43 is discharged from the housing 10 through the discharging port 19.

Next, the method of printing on tape M using the printer 1 will be described. First, the user opens the rear cover 5 on the main body 4 and mounts the cassette 17 into the cassette mounting compartment 24 of the printer 1. At this time, the roller drive shaft 29 in the cassette mounting compartment 24 is inserted into the roller 26 of the cassette 17. The user then closes the rear cover 5 on the main body 4. By closing the rear cover 5, the platen roller 47 is placed in a position near the print head 28, pressing the tape M and the ink ribbon against the print head 28. A controller of the printer 1 then drives the print head 28 and the motor in accordance with print data. The print head 28 prints an image on the tape M by heating the ink ribbon in accordance with the print data. The tape sub-roller 46 is positioned near the print head 28 and presses the tape M against the roller 26. The roller drive shaft 29 is rotated by the drive of the motor to rotate the roller 26. When rotated, the roller 26 conveys the tape M nipped between the roller 26 and the tape sub-roller 46 in the conveying direction, i.e., upward. After the printing is completed, the user operates the cutter lever 23 to cut the printed portion of the tape M off the remaining portion of the tape M. More specifically, in order to cut the tape M, the user rotates the cutter lever 23 from the normal position to the operated position. The rotation of the cutter lever 23 from the normal position to the operated position causes the movable blade 49 to move (rotate) from the retracted position to the cutting position, thereby cutting the tape M. In other words, the movable blade 49 moves (rotates) from the retracted position to the cutting position in conjunction with the rotation of the cutter lever 23 from the normal position to the operated position, thereby cutting the tape M. Through this operation, the cutting device 20 cuts the tape M to create a label having an image printed thereon, and the created label is discharged from the main body 4 through the discharging port 19.

The following is a description of how the cutter lever 23 receives an impact when the printer 1 having the above configuration is dropped. In the printer 1 of the present embodiment, in order to suppress the cutter lever 23 from interfering with the sensor 33, the side wall 234 of the cutter lever 23 extends to a higher position than the center C of the shaft 53 when the cutter lever 23 is in the normal position. Therefore, the cutter lever 23 is more likely to receive falling impacts in a non-rotational direction of the cutter lever 23, i.e., in the axial direction J than if the top end of the side wall 234 of the cutter lever 23 were positioned lower than the center C of the shaft 53.

For this reason, the second rib 62 and shaft 53 receive impacts that urge the cutter lever 23 to rotate in the axial direction J about the shaft 53. More specifically, when the cutter lever 23 is rotated counterclockwise in a plan view about the shaft 53 relative to the support plate 51, the second rib 62 and shaft 53 receive the impact that urges the cutter lever 23 to rotate in the axial direction J about the shaft 53. When the cutter lever 23 is rotated clockwise in a plan view about the shaft 53 relative to the support plate 51, the ribs 561 and 562 contact the support plate 51 and receive the impact that urges the cutter lever 23 to rotate in the axial direction J around the shaft 53.

The first rib 56 and shaft 53 receive impacts applied to the cutter lever 23 in a rightward direction from the side wall 234 toward the shaft 53. The rear end of the first rib 56 is positioned further rearward than the rear end (the rear surface in the present embodiment) of the support plate 51. Since the first rib 56 contacts the second end portion 61 of the support plate 51 from the left, the first rib 56 can easily receive a rightward impact from the side wall 234 toward the shaft 53. The impact to the first rib 56 is dispersed to the side wall 234 via the reinforcement rib 59 connected to the second surface 58 of the first rib 56.

According to the principle of leverage, the farther the portion of the shaft 53 that receives a rightward impact is from the portion of the shaft 53 that is supported by the support plate 51, the greater the impact on the portion of the shaft 53 that is supported by the support plate 51 is. For this reason, the connecting portion 541 is preferably connected to the insertion part 55 at a position as close as possible to the portion of the shaft 53 that is supported by the support plate 51. In the cutter lever 23 of the present embodiment, the connecting portion 541 is connected to the insertion part 55 at a position further in the facing direction D3 than the fifth end portion 66. Accordingly, the cutter lever 23 can receive impacts from falls in an area of the shaft 53 closer to the portion supported by the support plate 51 than if the connecting portion 541 were connected to the fifth end portion 66 of the insertion part 55.

Next, a cutting device 120 according to a variation of the embodiment will be described with reference to FIG. 9. The cutting device 120 according to the variation differs from the cutting device 20 in the above embodiment in that the cutting device 120 includes a cutter lever 123 having a second rib 98 in place of the cutter lever 23 having the second rib 62. However, the cutting device 120 has the same configurations as the cutting device 20 in the above embodiment in all other areas. Therefore, a description of configurations identical to those in the above embodiment will be omitted below and only the second rib 98 that differs from the embodiment will be described.

The second rib 98 in this variation protrudes in the facing direction D3 from the first wall 54 at a position apart from the insertion part 55. The second rib 98 has a third end portion 97. The third end portion 97 is the end portion of the second rib 98 in the facing direction D3. In the present variation, the third end portion 97 is the rear end portion of the second rib 98. When the cutter lever 123 is in the normal position, the third end portion 97 of the second rib 98 is spaced apart from the support plate 51. The distance between the third end portion 97 and the support plate 51 is preferably smaller than the thickness of the support plate 51. When the printer 1 having the cutting device 120 of this variation is inadvertently dropped, the shaft 53 and the second rib 98 receive an impact that urges the cutter lever 123 to rotate in the axial direction J around the shaft 53. Specifically, when the cutter lever 123 is rotated counter-clockwise in a plan view around the shaft 53 relative to the support plate 51, the second rib 98 contacts the support plate 51 and receives the impact that urges the cutter lever 123 to rotate in the axial direction J around the shaft 53. The second rib 98 in the cutting device 120 of this variation does not contact the support plate 51 when the printer 1 is in use. Accordingly, when the cutter lever 123 is moved from the normal position to the operated position, no friction is generated between the second rib 98 and the support plate 51. As a result, the cutter lever 123 moves more smoothly than a configuration in which the second rib 98 contacts the support plate 51.

The printer 1 is an example of the claimed "mobile printer." The housing 10 is an example of the claimed "housing." The left surface 13 is an example of the claimed "third surface." The lever accommodating part 14 is an example of the claimed "lever accommodating part." The cassette 17 is an example of the claimed "cassette." The cassette mounting compartment 24 is an example of the claimed "cassette mounting compartment." The sensor 33 is an example of the claimed "sensor." The movable blade 49 is an example of the claimed "cutting blade." The support plate 51 is an example of the claimed "support plate." The first wall 54 is an example of the claimed "first wall." The insertion part 55 is an example of the claimed "insertion part." The connecting portion 541 is an example of the claimed "connecting portion." The first rib 56 is an example of the claimed "first rib." The first surface 57 is an example of the claimed "first surface." The second surface 58 is an example of the claimed "second surface." The reinforcement rib 59 is an example of the claimed "reinforcement rib." The first end portion 60 is an example of the claimed "first end portion." The second end portion 61 is an example of the claimed "second end portion." The fourth end portion 65 is an example of the claimed "fourth end portion." The fifth end portion 66 is an example of the claimed "fifth end portion." The opening 67 is an example of the claimed "opening." The sixth end portion 68 is an example of the claimed "sixth end portion." The eighth end portion 70 is an example of the claimed "eighth end portion." The recess 71 is an example of the claimed "recess." The second wall 72 is an example of the claimed "second wall." The ninth end portion 90 is an example of the claimed "ninth end portion." The cutting devices 20 and 120 are each an example of the claimed "cutting device." The cutter levers 23 and 123 are each an example of the claimed "cutter lever." The second ribs 62 and 98 are each an example of the claimed "second rib." The third end portions 63 and 97 are each an example of the claimed "third end portion." The axial direction J is an example of the claimed "axial direction." The facing direction D3 is an example of the claimed "first direction." The separating direction D4 is an example of the claimed "second direction." The line segment L1 is an example of the claimed "line segment." The tangent line L2 is an example of the claimed "tangent line." The perpendicular line L3 is an example of the claimed "perpendicular line." The tape M is an example of the claimed "tape." The operating wall portion 233 is an example of the claimed "seventh end portion."

The printer 1 in the above embodiment includes the print head 28 and the cutting device 20. The print head 28 is configured to print on tape M. The cutting device 20 in the above embodiment includes the movable blade 49, support plate 51, shaft 53, and cutter lever 23. The movable blade 49 is movable between the cutting position for contacting and cutting a cutting target, and a retracted position in which the movable blade 49 is separated from the cutting target. The retracted position is separated from the cutting position. The shaft 53 extends in the axial direction J, which is orthogonal to the support plate 51, and is supported by the support plate 51. The cutter lever 23 is supported by the shaft 53 so as to be rotatable about the shaft 53 between an operated position for placing the movable blade 49 in the cutting position, and a normal position for placing the movable blade 49 in the retracted position. The cutter lever 23 includes the first wall 54, insertion part 55, and first rib 56. The first wall 54 faces the support plate 51 in the axial direction J. The insertion part 55 protrudes from the first wall 54 in the facing direction D3, which is a direction from the first wall 54 toward the support plate 51 along the shaft 53 (i.e., along the axial direction J). The first end portion 60 of the insertion part 55 in the facing direction D3 is in contact with the support plate 51. The shaft 53 is inserted in the insertion part 55. The first rib 56 protrudes in the facing direction D3 from the first wall 54. When the cutter lever 23 is in the normal position, the first surface 57 of the first rib 56 is in contact with the support plate 51. The first surface 57 extends in the axial direction J. By virtue of the first rib 56 in contact with the support plate 51, the cutting device 20 can disperse an impact on the shaft 53 of the cutter lever 23 from a fall. Therefore, the first rib 56 of the cutting device 20 can help reduce the occurrence of malfunctions caused by impacts to the cutting device 20 from falls better than a conventional cutting device not provided with the first rib 56.

The cutting device 20 includes the reinforcement rib 59. The reinforcement rib 59 protrudes in the facing direction D3 from the first wall 54 and is connected to the second surface 58 of the first rib 56. The second surface 58 is the opposite surface of the first surface 57. In the cutting device 20, the reinforcement rib 59 can receive an impact on the first rib 56 due to the cutting device 20 being dropped since the reinforcement rib 59 is connected to the second surface 58 of the first rib 56. Therefore, the reinforcement rib 59 of the cutting device 20 helps reduce the occurrence of malfunctions caused by impacts when the cutting device 20 is dropped, compared to a cutting device not provided with the reinforcement rib 59.

In the cutting device 20, the first surface 57 of the first rib 56 is in contact with the second end portion 61 of the support plate 51 when the cutter lever 23 is in the normal position. The second end portion 61 is an end portion of the support plate 51 in a direction orthogonal to the axial direction J. With the first rib 56 contacting the second end portion 61 of the support plate 51, the cutting device 20 can disperse impacts received when the cutting device 20 is dropped. Therefore, the cutting device 20 of this configuration can help facilitate the dispersion of impacts to the first rib 56 when the cutting device 20 is dropped better than if the first rib 56 were contacting a portion of the support plate 51 other than the second end portion 61.

The cutter lever 23 in the cutting device 20 of the above embodiment includes the second rib 62. The second rib 62 protrudes in the facing direction D3 from the first wall 54 and is positioned apart from the insertion part 55. When the cutter lever 23 is in the normal position, the third end portion 63 of the second rib 62 is in contact with the support plate 51. The third end portion 63 is the end portion of the second rib 62 in the facing direction D3. The first rib 56 and second rib 62 of the cutting device 20 can disperse impacts on the shaft 53 of the cutter lever 23 caused by falls. Therefore, the second rib 62 of the cutting device 20 can help mitigate impacts on the shaft 53 of the cutter lever 23 from falls better than if only the first rib 56 were provided to disperse an impact when the cutting device 20 is dropped.

The cutter lever 123 of the cutting device 120 in the above variation includes the second rib 98. The second rib 98 protrudes in the facing direction D3 from the first wall 54 and is positioned apart from the insertion part 55. When the cutter lever 123 is in the normal position, the third end portion 97 of the second rib 98 is spaced apart from the support plate 51. The third end portion 97 is the end portion of the second rib 98 in the facing direction D3. Since the third end portion 97 in the cutting device 120 of the variation is spaced apart from the support plate 51 during normal use, operability of the cutter lever 123 is not impaired because of no friction generated between the third end portion 97 and support plate 51 during normal use. However, by adjusting the gap between the second rib 98 and support plate 51 in the cutting device 120 such that the two parts contact each other when the cutter lever 123 is impacted in a fall, the impact on the cutter lever 123 can be dispersed to both the first rib 56 and second rib 98. Thus, the second rib 98 of the cutting device 20 helps mitigate an impact on the shaft 53 of the cutter lever 123 in a fall better than a configuration in which impacts from dropping the cutting device 20 are dispersed only through the first rib 56.

The second rib 62 in the above embodiment has a U-shaped that opens the insertion part 55 when viewed from a position further in the facing direction D3 than the third end portion 63. The third end portion 63 of the second rib 62 of the cutting device 20 helps reduce the likelihood of deformation or damage to the second rib 62 when the second rib 62 receives an impact when the cutting device 20 is dropped better than if the shape of the second rib 62 viewed from the position further in the facing direction D3 than the third end portion 63 were linear.

The insertion part 55 is positioned between the first rib 56 and the second rib 62 in the extension direction D5 of the line segment L1 connecting the first rib 56 and the second rib 62 to each other. The insertion part 55 of the cutting device 20 can disperse impacts to the first rib 56 and second rib 62 when the cutting device 20 is dropped more easily than if the insertion part 55 were not positioned between the first rib 56 and second rib 62 in the extension direction D5 of the line segment L1 connecting the first rib 56 to the second rib 62.

The first wall 54 includes the connecting portion 541, which is connected to the insertion part 55. The fourth end portion 65 of the connecting portion 541 is positioned further in the facing direction D3 than the fifth end portion 66 of the insertion part 55. The fourth end portion 65 is the end portion of the connecting portion 541 in the separating direction D4, which is opposite the facing direction D3. The fifth end portion 66 is the end portion of the insertion part 55 in the separating direction D4. When the cutting device 20 is dropped, the connecting portion 541 of the cutting device 20 can transmit an impact to the insertion part 55 at a stronger position closer to the area in which the support plate 51 is in contact with the first end portion 60 of the insertion part 55 than if the fourth end portion 65 were positioned further in the separating direction D4 than the fifth end portion 66. Therefore, the connecting portion 541 in the cutting device 20 can help mitigate impacts on the shaft 53 of the cutter lever 23 incurred in a fall.

The cutting device 20 includes the housing 10 that accommodates the movable blade 49 and support plate 51. The housing 10 has the left surface 13 having the opening 67 for exposing a portion of the cutter lever 23 outside the housing 10. The center C of the shaft 53 is positioned further in the operating direction D1 than the perpendicular line L3 to the tangent line L2 drawn from the sixth end portion 68 of the left surface 13 to the cutter lever 23. The perpendicular line L3 is on a virtual plane along the first wall 54. The sixth end portion 68 is the end portion of the left surface 13 in the operating direction D1. The operating direction D1 is a direction in which the cutter lever 23 is moved (rotated) from the normal position to the operated position. In the cutting device 20, the center C of the shaft 53 is positioned further in the operating direction D1 relative to the perpendicular line L3. Therefore, an impact is more likely to be received by the shaft 53 of the cutter lever 23 when the cutting device 20 is dropped than if the center C of the shaft 53 were positioned further in the returning direction D2, which is opposite the operating direction D1, relative to the perpendicular line L3. By providing the first rib 56 in the cutting device 20, the cutting device 20 can help mitigate impacts on the shaft 53 of the cutter lever 23 due to falls better than conventional devices, although the center C of the shaft 53 is positioned further in the operating direction D1 relative to the perpendicular line L3.

The printer 1 includes the lever accommodating part 14 that protrudes from the left surface 13. The lever accommodating part 14 accommodates a part of the cutter lever 23 in a manner that allows rotation of the cutter lever 23 and exposes the operating wall portion 233 to the outside of the housing 10. The operating wall portion 233 is an end portion of the cutter lever 23 in the returning direction D2, which is opposite the operating direction D1. The cutting device 20 having the lever accommodating part 14 can help protect a part of the cutter lever 23 in the lever accommodating part 14 better than if the lever accommodating part 14 were not provided.

The tape M is accommodated in the cassette 17. The printer 1 includes: the cassette mounting compartment 24 in which the cassette 17 is detachably mountable; the sensor 33 configured to detect the type of the cassette 17 mounted in the cassette mounting compartment 24; the housing 10 that accommodates the print head 28, cutting device 20, cassette mounting compartment 24, and sensor 33; and the lever accommodating part 14 that protrudes from the housing 10. The lever accommodating part 14 accommodates a part of the cutter lever 23 such that rotation of the cutter lever 23 is permitted and the operating wall portion 233 is exposed outside the housing 10. The operating wall portion 233 is an end portion of the cutter lever 23 in the returning direction D2, which is opposite the operating direction D1. The cutter lever 23 includes the second wall 72 positioned further in the facing direction D3 than the first wall 54. The eighth end portion 70 of the second wall 72 is recessed in the returning direction D2 relative to the ninth end portion 90 of the first wall 54 to form the recess 71. The eighth end portion 70 is the end portion of the second wall 72 in the operating direction D1. The ninth end portion 90 is the end portion of the first wall 54 in the operating direction D1. When the cutter lever 23 is in the operated position, the first wall 54 faces the sensor 33 in the axial direction J, and the second wall 72 faces the sensor 33 in the operating direction D1. The lever accommodating part 14 can help protect a part of the cutter lever 23 better than if the lever accommodating part 14 were not provided. The cutter lever 23 can be suppressed from interfering with the sensor 33 when the cutter lever 23 is operated.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The configurations of the cutting device 20 and the printer 1 may be modified as appropriate. For example, the cutting device 20 need not necessarily be provided in the printer 1. The type of printer 1 may also be modified as needed. For example, the printer 1 may be an inkjet printer with an inkjet head as the print head 28. The fixed blade 48 may be eliminated from the cutting blades 43, and the tape M may be cut by moving the movable blade 49 to press both the movable blade 49 and the tape M against a receiving member. The cutting blades 43 just need to have the capability to perform at least one of manual and automatic cutting operations. Further, the layout of the sensor 33 may be modified as needed, or the sensor 33 may be omitted from the printer 1. The types of cassettes 17 that can be mounted in the printer 1, as well as the types and configurations of tapes M that can be accommodated in the cassettes 17, may be modified as needed. The printer 1 may also be configured to print on tape M not accommodated in a cassette 17. The printer 1 may also be a mobile printer (a portable printer) that can be used when resting on a desk.

The shapes, configurations, and arrangements of the cutter lever 23 and support plate 51 may be modified as needed. The connecting portion 541 and outer wall portion 542 of the first wall 54 may be the same distance from the support plate 51 in the axial direction J, i.e., the front-rear direction. The region in the axial direction J at which the connecting portion 541 connects to the insertion part 55 may be modified as needed. The arrangements and shapes of the first rib 56, reinforcement rib 59, and second rib 62 may be modified as needed. For example, the shape of the second rib 62 when viewed from a perspective further in the facing direction D3 than the third end portion 63 may be appropriately modified to any shape including a T-shape or an E-shape. When the cutter lever 23 is in the normal position, the first surface 57 of the first rib 56 may be spaced apart from the second end portion 61 of the support plate 51 in a direction orthogonal to the axial direction J. In this case, the first rib 56 just needs to contact the support plate 51 in response to an impact on the cutter lever 23 when the cutting device 20 is dropped.

Each of the second ribs 62 and 98 may protrude in the facing direction D3 from the first wall 54 at a position in which at least a portion of each of the second ribs 62 and 98 is in contact with the insertion part 55. The insertion part 55 also need not be positioned between the first rib 56 and second rib 62 in the extension direction D5 of the line segment L1 connecting the first rib 56 to the second rib 62. For example, the insertion part 55 may be located at a position overlapping either the first rib 56 or the second rib 62 in the extension direction D5 of the line segment L1.

The center C of the shaft 53 may be located further in the returning direction D2 relative to the perpendicular line L3, which is on the virtual plane along the first wall 54, to the tangent line L2. The lever accommodating part 14 may protrude from a surface other than the left surface 13 of the printer 1 or may be omitted as needed. The position of the sensor 33 may be modified as needed, and the shape of the cutter lever 23 may be modified in accordance with the presence and layout of the sensor 33. For example, the recess 71 need not be formed in the second wall 72.

The above variations may be combined as appropriate to the extent that there is no contradiction. In addition to the combinations recited in the claims, the applicant intends to obtain patent rights for combinations of the above variations to the extent that they do not depart from the spirit of the invention and do not cause any contradictions.

What is claimed is:

1. A cutting device comprising:

a support plate;

a shaft supported by the support plate, the shaft extending in an axial direction orthogonal to the support plate;

a cutting blade movable between a cutting position for contacting and cutting a cutting target and a retracted position separated from the cutting position; and a cutter lever supported by the shaft so as to be rotatable about the shaft between a normal position and an operated position, rotation of the cutter lever from the normal position to the operated position causing the cutting blade to move from the retracted position to the cutting position, the cutter lever comprising:

a first wall facing the support plate in the axial direction;

an insertion part in which the shaft is inserted, the insertion part protruding from the first wall in a first direction, the first direction being a direction from the first wall toward the support plate along the axial direction, the insertion part having a first end portion in contact with the support plate, the first end portion being an end portion of the insertion part in the first direction; and a first rib protruding from the first wall in the first direction, the first rib having a first surface extending in the axial direction, the first surface being in contact with the support plate when the cutter lever is in the normal position.

2. The cutting device according to claim 1, wherein the first rib further has a second surface opposite the first surface, and wherein the cutter lever further comprises:

a reinforcement rib protruding from the first wall in the first direction, the reinforcement rib being connected to the second surface.

3. The cutting device according to claim 1, wherein the support plate has a second end portion, the second end portion being an end portion of the support plate in a direction orthogonal to the axial direction, and wherein the first surface of the first rib is in contact with the second end portion of the support plate when the cutter lever is in the normal position.

4. The cutting device according to claim 1, wherein the cutter lever further comprises:

a second rib protruding from the first wall in the first direction, the second rib being positioned apart from the insertion part, the second rib having a third end portion, the third end portion being an end portion of the second rib in the first direction, the third end portion is in contact with the support plate when the cutter lever is in the normal position.

5. The cutting device according to claim 4, wherein the second rib has a U-shape that opens toward the insertion part as viewed from a position further in the first direction than the third end portion.

6. The cutting device according to claim 4, wherein the insertion part is positioned between the first rib and the second rib in a direction in which a line segment extends, the line segment connecting the first rib and the second rib to each other.

7. The cutting device according to claim 1, wherein the cutter lever further comprises:

a second rib protruding from the first wall in the first direction, the second rib being positioned apart from the insertion part, the second rib having a third end portion, the third end portion being an end portion of the second rib in the first direction, the third end portion being spaced apart from the support plate when the cutter lever is in the normal position.

8. The cutting device according to claim 7, wherein the second rib has a U-shape that opens toward the insertion part as viewed from a position further in the first direction than the third end portion.

9. The cutting device according to claim 7, wherein the insertion part is positioned between the first rib and the second rib in a direction in which a line segment extends, the line segment connecting the first rib and the second rib to each other.

10. The cutting device according to claim 1, wherein the first wall comprises:

a connecting portion connected to the insertion part, the connecting portion having a fourth end portion, the fourth end portion being an end portion of the connecting portion in a second direction opposite the first direction, wherein the insertion part has a fifth end portion, the fifth end portion being an end portion of the insertion part in the second direction, and wherein the fourth end portion of the connecting portion is positioned further in the first direction than the fifth end portion of the insertion part.

11. The cutting device according to claim 1, further comprising:

a housing accommodating the cutting blade and the support plate, the housing having a third surface having an opening through which a part of the cutter lever is exposed to an outside of the housing, the third surface having a sixth end portion, the sixth end portion being an end portion of the third surface in an operating direction in which the cutter lever is rotated from the normal position to the operated position, wherein a center of the shaft is positioned further in the operating direction than a perpendicular line to a tangent line drawn from the sixth end portion to the cutter lever, the perpendicular line being on a virtual plane along the first wall, the perpendicular line passing through an intersecting point at which the tangent line intersects the cutter lever.

12. The cutting device according to claim 11, wherein the cutter lever has a seventh end portion, the seventh end portion being an end portion of the cutter lever in a returning direction opposite the operating direction, and wherein the housing includes a lever accommodating part protruding from the third surface, the lever accommodating part accommodating a part of the cutter lever in a manner that allows rotation of the cutter lever and exposes the seventh end portion to an outside of the housing.

13. A mobile printer comprising:

a print head configured to print on a tape; and a cutting device configured to cut the tape, the cutting device comprising:

a support plate;

a shaft supported by the support plate, the shaft extending in an axial direction orthogonal to the support plate;

a cutting blade movable between a cutting position for contacting and cutting the tape and a retracted position separated from the cutting position; and a cutter lever supported by the shaft so as to be rotatable about the shaft between a normal position and an operated position, rotation of the cutter lever from the normal position to the operated position causing the cutting blade to move from the retracted position to the cutting position, the cutter lever comprising:

a first wall facing the support plate in the axial direction;

an insertion part in which the shaft is inserted, the insertion part protruding from the first wall in a first direction, the first direction being a direction from the first wall toward the support plate along the axial direction, the insertion part having a first end portion in contact with the support plate, the first end portion being an end portion of the insertion part in the first direction; and a first rib protruding from the first wall in the first direction, the first rib having a first surface extending in the axial direction, the first surface being in contact with the support plate when the cutter lever is in the normal position.

14. The mobile printer according to claim 13, wherein the cutter lever has a seventh end portion, the seventh end portion being an end portion of the cutter lever in a returning direction opposite an operating direction in which the cutter lever is rotated from the normal position to the operated position, wherein the cutter lever further comprises:

a second wall positioned further in the first direction than the first wall, the second wall having an eighth end portion, the eighth end portion being an end portion of the second wall in the operating direction, wherein the first wall has a ninth end portion, the ninth end portion being an end portion of the first wall in the operating direction, and wherein the eighth end portion of the second wall is recessed in the returning direction relative to the ninth end portion of the first wall to form a recess, the mobile printer further comprising:

a cassette mounting compartment in which a cassette accommodating the tape is detachably mountable;

a sensor configured to detect a type of the cassette mounted in the cassette mounting compartment; and a housing comprising:

a main body accommodating the print head, the cutting device, the cassette mounting compartment, and the sensor; and a lever accommodating part protruding from the main body, the lever accommodating part accommodating a part of the cutter lever in a manner that allows rotation of the cutter lever and exposes the seventh end portion to an outside of the housing, wherein, when the cutter lever is in the operated position, the first wall faces the sensor in the axial direction and the second wall faces the sensor in the operating direction.

* * * * *